United States Patent
Urbach

(10) Patent No.: US 9,773,332 B2
(45) Date of Patent: Sep. 26, 2017

(54) VISUAL CORTEX THOUGHT DETECTOR INTERFACE

(71) Applicant: Julian Michael Urbach, Sherman Oaks, CA (US)

(72) Inventor: Julian Michael Urbach, Sherman Oaks, CA (US)

(73) Assignee: OTOY, INC., Los Angeles, CA (US)

( * ) Notice: Subject to any disclaimer, the term of this patent is extended or adjusted under 35 U.S.C. 154(b) by 254 days.

(21) Appl. No.: 13/830,370

(22) Filed: Mar. 14, 2013

(65) Prior Publication Data

US 2014/0267401 A1   Sep. 18, 2014

(51) Int. Cl.
    *G09G 5/00* (2006.01)
    *G06T 11/60* (2006.01)
    *G02B 27/01* (2006.01)

(52) U.S. Cl.
    CPC ............ *G06T 11/60* (2013.01); *G02B 27/017* (2013.01); *G02B 2027/014* (2013.01); *G02B 2027/0118* (2013.01); *G02B 2027/0178* (2013.01)

(58) Field of Classification Search
    CPC .................. G06T 11/60; G02B 27/017; G02B 2027/0118; G02B 2027/014; G02B 2027/0178
    USPC .................................... 345/7–8; 600/544–545
    See application file for complete search history.

(56) References Cited

U.S. PATENT DOCUMENTS

| | | | |
|---|---|---|---|
| 4,651,145 A * | 3/1987 | Sutter ........................... | 345/156 |
| 8,405,610 B1 * | 3/2013 | Cole ...................... | G06F 3/013 345/158 |
| 8,786,546 B1 * | 7/2014 | Bendickson et al. ......... | 345/157 |
| 2007/0179396 A1 | 8/2007 | Le et al. | |
| 2007/0265507 A1 | 11/2007 | de Lemos | |
| 2008/0062297 A1 * | 3/2008 | Sako et al. ............... | 348/333.02 |
| 2008/0259337 A1 * | 10/2008 | Sagara et al. ................ | 356/432 |
| 2009/0088659 A1 * | 4/2009 | Graham et al. ............... | 600/545 |

(Continued)

FOREIGN PATENT DOCUMENTS

| JP | 05-244539 | 9/1993 |
|---|---|---|
| JP | 05244539 A * | 9/1993 |

(Continued)

OTHER PUBLICATIONS

Cheng; "Researchers help users control second life avatars via brain activity"; Oct. 15, 2007; 1 page.

(Continued)

*Primary Examiner* — Rodney Amadiz
(74) *Attorney, Agent, or Firm* — James J. DeCarlo; Greenberg Traurig, LLP

(57) ABSTRACT

A wearable computing device comprises one or more eye pieces each of which further comprises a flexible frame surrounding a display screen and tactile elements arranged on the perimeter of the display screen. The tactile elements provide tactile feedback to the user that is synchronous with the display on the display screen. A detection system is also included in the flexible frame to monitor the movements of a wearer's eyes and the eye sockets and to execute various tasks in response to the detected movements. A visual cortex thought detector also coupled to the wearable computing device obtains information regarding the wearer's thoughts and manipulates a display on the display screen based on the obtained information.

18 Claims, 13 Drawing Sheets

(56) References Cited

U.S. PATENT DOCUMENTS

| | | | |
|---|---|---|---|
| 2012/0049998 A1* | 3/2012 | Lim et al. ................... 340/1.1 |
| 2012/0075167 A1* | 3/2012 | Lahcanski et al. .............. 345/8 |
| 2012/0235900 A1* | 9/2012 | Border .................. G02B 5/23 |
| | | | 345/156 |
| 2013/0009993 A1* | 1/2013 | Horseman ................. 345/633 |
| 2013/0158883 A1* | 6/2013 | Hasegawa et al. ............ 702/19 |
| 2013/0218197 A1* | 8/2013 | Tarumi ................. A61H 39/04 |
| | | | 606/204 |
| 2013/0314514 A1* | 11/2013 | Mochinaga et al. ........... 348/54 |
| 2014/0266647 A1* | 9/2014 | Visitacion et al. ........ 340/407.1 |
| 2015/0018927 A1* | 1/2015 | Warschewske ....... A61M 21/00 |
| | | | 607/141 |

FOREIGN PATENT DOCUMENTS

| | | | |
|---|---|---|---|
| JP | 08-266477 | | 10/1996 |
| JP | 2000-210468 | | 8/2000 |
| JP | 2000210468 A | * | 8/2000 |
| JP | 2001276113 A | * | 10/2001 |
| JP | 2010-252860 | | 11/2010 |
| JP | 2012-073329 | | 4/2012 |

OTHER PUBLICATIONS

PuneMirror.in; "Augmented reality glasses go handsfree"; Nov. 14, 2012; 2 pages.

Wikipedia; "Smart glass"; httpllen.wikipedia.org/wiki/Smart_glass; Nov. 8, 2012; 8 pages.

Thomas, Nigel; "Which Part of the Brain does Imagination Come From?"; Apr. 4, 2011; 3 pages.

http://www.darkgovernment.com/news/predicting-behavior-through-brain-scans/ "Predicting Behavior Through Brain Scans"; Oct. 5, 2012; 6 pages.

C.I.A. Searching Social Media; "Scientists Recording Video of your Thoughts"; http://www.darkgovernment.com/news/scientists-recording-video-of-your-thoughts; Oct. 5, 2012; 6 pages.

Notification of Transmittal of the International Search Report and the Written Opinion of the International Searching Authority, Or the Declaration for PCT/US2014/027550) dated Jul. 17, 2014; 21 pages.

* cited by examiner

VISUAL CORTEX THOUGHT DETECTOR INTERFACE

The present disclosure relates to systems and methods for generating and manipulating augmented or virtual reality displays.

BACKGROUND

Increasing computational power of microprocessors and sophistication of data transmission systems has permitted development of portable devices such as tablets and smart phones to the extent that they are replacing traditional desktops and laptops as preferred devices not only for personal computing but also for business purposes. In a further evolution, wearable computing devices have emerged which are capable of presenting additional information, for example, from the Internet, that can enhance a real world viewing experience of a user. Augmented reality glasses are used to generate overlays on the field of view of an eye to present additional information or to collect and record information from the real world. In order to address the processing requirements for such portable devices, cloud computing systems are used so that the processing intensive tasks associated with data manipulation are executed at a central location, remote from the user while the results of the processing tasks are distributed among the various portable devices.

SUMMARY

This disclosure is related to a wearable computing system that provides content retrieved locally or from a networked source in synchrony with tactile feedback. The wearable computing system comprises at least one wearable eye piece. The wearable eye piece further comprises a flexible frame configured for shape-mating engagement with an eye socket of a human wearer such that ambient light transmission is substantially blocked between the frame and the eye socket. A display screen is fixed to an aperture in the frame such that the display shape-matingly engages with the flexible frame covers a field of view of the eye. A first processor that facilitates processing data and generating a display on the display screen and a processor readable storage medium for storing program logic are also comprised within the wearable computing system. In addition, a plurality of tactile elements responsive to said program logic arranged on the flexible frame, the tactile elements are communicatively coupled with the first processor and are selectively activatable by the first processor in response to the display on the display screen. Therefore, the tactile element control logic is included in the program logic stored on the processor readable storage medium and is executable by the first processor, for controlling the tactile elements.

In an embodiment, the flexible frame comprises an eye gasket such that the plurality of tactile elements are arranged on a rim of the eye gasket. The eye gasket facilitates the mating with the eye socket and the blockage of the ambient light. In an embodiment, the flexible frame further comprises a nose bridge member that comprises the first processor. The flexible frame can also comprise a transceiver such that the transceiver receives and sends communication signals. At least one speaker and a microphone are also arranged on the flexible frame so that the speaker generates audio signals and the microphone is operable for receiving audio input.

In an embodiment, the wearable computing system comprises two wearable eye pieces arranged side by side and configured to mate with each of two eye sockets of the human wearer.

In an embodiment, a detection module that detects movements associated with the eye socket and the eye of the wearer. In an embodiment, the detection module comprises a camera. In an embodiment, the detection module also comprises the plurality of tactile elements.

In an embodiment, the programming logic further comprises image manipulation logic, executed by the first processor, for controlling display on the display screen in response to the movements detected by the detection module. In an embodiment, the programming logic also comprises a tactile element mapping logic, executed by the first processor, for mapping each of the plurality of tactile elements to different parts of an image projected on the display screen such that activation of a part of the image activates a respective one of the tactile elements.

A method of providing content is disclosed in an embodiment. The method comprises, displaying to a user, by a processor, visual content on a display screen fixed to a flexible frame of a wearable computing device. The flexible frame is engaged in a shape mating arrangement with at least one of the user's eyes. The method further comprises, providing to the user, by the processor, tactile feedback around the user's eye, the tactile feedback is provided in synchrony with the visual content. In an embodiment, the tactile feedback is provided by activating the tactile elements attached to the flexible frame for example, by vibrating or heating at least a subset of the tactile elements.

In an embodiment, each of the tactile elements are mapped to a particular part of an avatar comprised in the visual content and providing tactile feedback in synchrony with the visual content further comprises activating specific ones of tactile elements based on experiences of the particular part of the avatar in the visual content.

In an embodiment, the method further comprises detecting, by the processor, movements of one or more of eyes and facial muscles around the eyes and executing particular tasks in response to the detected movements. In an embodiment, detecting the movements of the eyes and facial muscles further comprises collecting, by the processor, data regarding movement of one or more of the eyes and the facial muscles from a camera the particular tasks executed by the processor comprise at least manipulation, by the processor, of a display on the display screen based on the detected movements. In an embodiment, the particular tasks executed by the processor can also comprise mapping, by the processor, each of the tactile elements to a particular part of an avatar comprised in the visual content and manipulating, particular parts of an avatar comprised in the visual content in response to the detected movements.

A non-transitory computer readable storage medium, comprising processor executable instructions is disclosed in an embodiment. The storage medium comprises instructions that cause the processor to display visual content to a user on a display screen fixed to a flexible frame of a wearable computing device, the flexible frame is engaged in a shape mating arrangement with at least one of the user's eyes. The instructions also cause the processor to provide tactile feedback to the user around the user's eye, the tactile feedback is provided in synchrony with the visual content.

In an embodiment, the tactile feedback is provided by activating, by the processor, tactile elements attached to the flexible frame for example, by vibrating or heating at least a subset of the tactile elements. In an embodiment, each of the tactile elements are mapped to a particular part of an avatar comprised in the visual content and providing tactile feedback in synchrony with the visual content further comprises activating specific ones of tactile elements based on experiences of the particular part of the avatar in the visual content.

In an embodiment, the method further comprises detecting, by the processor, movements of one or more of eyes and facial muscles around the eyes and executing particular tasks in response to the detected movements. In an embodiment, detecting the movements of the eyes and facial muscles further comprises collecting, by the processor, data regarding movement of one or more of the eyes and the facial muscles from a camera the particular tasks executed by the processor comprise at least manipulation, by the processor, of a display on the display screen based on the detected movements. In an embodiment, the particular tasks executed by the processor can also comprise mapping, by the processor, each of the tactile elements to a particular part of an avatar comprised in the visual content and manipulating, particular parts of an avatar comprised in the visual content in response to the detected movements.

A system comprising at least one tactile element mounted to a flexible frame of a wearable eye piece is disclosed in an embodiment. The at least one tactile element is mounted on a perimeter of a display screen of the wearable eyepiece. The tactile element is communicatively coupled to a processor and the flexible frame is configured for a shape mating engagement with an eye socket of a human wearer such that ambient light is blocked. The tactile element comprises a base, a neck and a head, the tactile element is attached to the flexible frame at the base such that the head of the tactile element is in contact with the wearer's ski. A bi-directional actuation mechanism comprising a current-carrying coil, a pair of magnets, and a signal contact plate is comprised within the base of the tactile element. The bi-directional actuation mechanism is configured for actuating the tactile element and detecting movement of muscles in the eye socket of the wearer.

In an embodiment, the bi-directional actuation mechanism further comprises a spherical body within the signal contact plate for actuation of the tactile element. At least one of the magnets is attached to the spherical body. The spherical body and the signal contact plate are configured such that the spherical body can rotate freely along a plurality of axis within the signal contact plate. In an embodiment, the system can further comprise a plurality of speakers. A connecting wire connects the spherical body with the plurality of speakers and a gel pad is arranged such that the gel pad is in contact with the wearer and faces of the speakers are positioned in the gel pad. In an embodiment, the tactile element comprises a heating element.

In an embodiment, the at least one tactile element comprises a plurality of tactile elements. A subset of the plurality of tactile elements have surfaces in contact with the wearer's skin textured in a manner that is different from surfaces in contact with the wearer's skin of a different subset of the plurality of tactile elements. In an embodiment, the tactile element is a suction cup. In an embodiment, the tactile element is a pin hole on the flexible frame.

A method of providing content is disclosed in an embodiment. The method comprises providing a tactile element on a flexible frame of a wearable eye piece that is in shape-mating engagement with an eye socket of a human wearer such that ambient light is blocked. The method further provides for activating, by a processor, the tactile element in synchrony with video content displayed on a display screen of the wearable eye piece and detecting physical actuation of the tactile element caused by movements in muscles of the eye socket by detecting current induced in a coil comprised within the tactile element due to the physical actuation.

In an embodiment, the activation of the tactile element in synchrony with the video content further comprises vibrating, by the processor, the tactile element by inducing current through a coil comprised within the tactile element. In an embodiment, activation of the tactile element in synchrony with the video content further comprises heating, by the processor, a heating element comprised within the tactile element. In an embodiment, activation of the tactile element in synchrony with the video content further comprises generating, by the processor, suction via the tactile element that attracts the wearer's skin. In an embodiment, activation of the tactile element in synchrony with the video content further comprises providing, by the processor, audio feedback to the wearer through speakers comprised within the tactile element.

A computer readable storage medium is disclosed in an embodiment. The computer readable medium comprises instructions, which when executed by a processor cause the processor to activate a tactile element in synchrony with video content displayed on a display screen of a wearable eye piece and detect physical actuation of the tactile element caused by movements in muscles of the eye socket. The tactile element is fixed to a flexible frame of a wearable eye piece that is in shape-mating engagement with an eye socket of a human wearer such that ambient light is blocked.

A system comprising at least one wearable eye piece is disclosed in an embodiment. The eye piece comprises a flexible frame, a display screen fixed to an aperture in the frame and a visual cortex input detecting module attached to the flexible frame for detecting input from the visual cortex of the wearer. The flexible frame is configured for shape-mating engagement with an eye socket of a human wearer such that ambient light transmission is substantially blocked between the frame and the eye socket. A first processor in communication with the visual cortex input detecting module is further comprised in the system such that the first processor facilitates processing the input and generating a display on the display screen based on program logic stored on a processor readable storage medium also comprised within the system.

In an embodiment, the programming logic comprises a visual cortex display generating logic for generating a display on the display screen based on the input from the visual cortex of the wearer. The visual cortex display generating logic further comprises avatar manipulation logic for manipulating an avatar displayed on the display screen based on the input from the visual cortex of the wearer. The programming logic also comprises a visual cortex input storage logic for storing the input from the visual cortex in a computer readable storage medium and a secondary display generating logic for generating the display based on stored input obtained from a visual cortex of a second user different from the wearer.

In an embodiment, the system further comprises a plurality of tactile elements attached to the flexible frame, the tactile elements are communicatively coupled with the first processor and are selectively activated by the first processor in response to the display on the display screen. Tactile element manipulation logic, is comprised within the programming logic and executed by the first processor, for manipulating the tactile elements based on the input from the visual cortex of the wearer.

A method of providing content is disclosed in an embodiment. The method comprises various processor executable steps that include obtaining, by a first processor as electrical signals, input from a visual cortex of a first user, interpreting the electrical signals to generate a representation of the input from the visual cortex of the first user and at least one of displaying or storing visual content based on the representation to the first user on a display screen. The display screen is fixed to a flexible frame of a wearable computing device, the flexible frame is engaged in a shape mating arrangement with at least one of the first user's eye. In an embodiment, the visual content based on the representation can be stored. In an embodiment, the visual content is the representation. In an embodiment, the display comprises an avatar. In an embodiment, displaying the visual content to the first user based on the representation further comprises manipulating, by the first processor, using the input, a display shown to the first user prior to obtaining the input from the visual cortex. In an embodiment, manipulating a display further comprises changing, by the first processor, a visual attribute of an element comprised in the display based on the input from the visual cortex. In an embodiment, the visual content comprises a pattern obtained as input from the visual cortex of the first user. The method further comprises activating, by the first processor, a tactile element attached to the flexible frame based on the input from the visual cortex.

The method also comprises transmitting, by a second processor, the visual content to a second user different from the first user in accordance with one embodiment. In an embodiment, the second processor is different from the first processor. The method further comprises steps executed by the second processor. The steps comprise receiving input from a visual cortex of the second user, generating new visual content by altering the visual content based on the input from the visual cortex of the second user and storing the new visual content in a processor readable storage medium.

A computer readable storage medium, comprising processor executable instructions is disclosed in an embodiment. The instructions when executed by a processor cause the processor to obtain input from a visual cortex of a first user as electrical signals, generate a representation of the input from the visual cortex of the first user by interpreting the electrical signals and display visual content based on the representation on a display screen fixed to a flexible frame of a wearable computing device. The flexible frame is engaged in a shape mating arrangement with at least one of the first user's eye.

These and other embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1A:
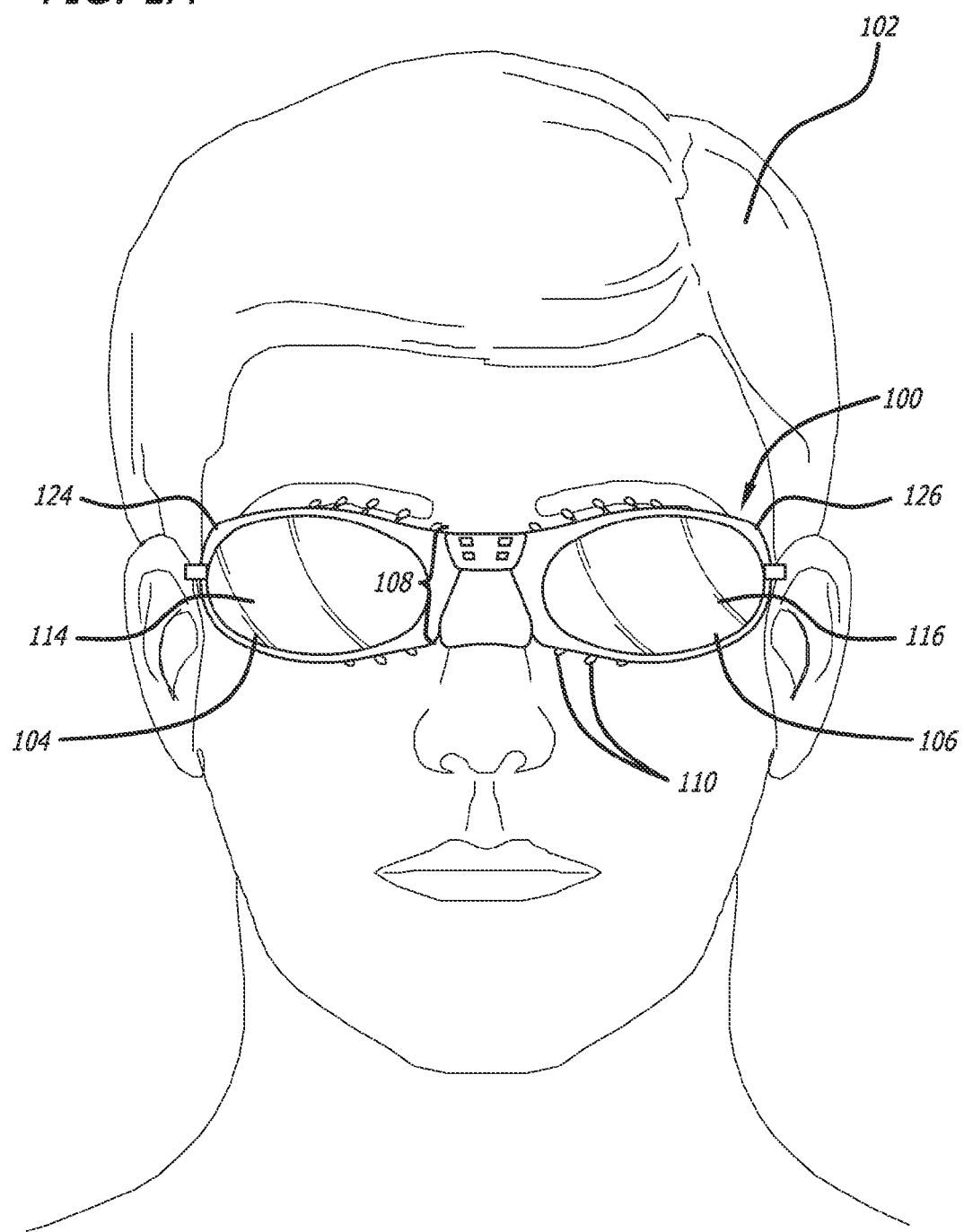
FIG. 1A is an illustration of a human user employing the wearable computing system/device in accordance with embodiments of the present disclosure.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof. The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Cloud computing has recently emerged as a solution to address situations where processor intensive tasks are needed to be carried out in the world of mobile computing. They are used for personal computing tasks and by businesses for storage and data processing needs. In personal computing, gaming on the cloud has gained great popularity in view of the high processing resources demanded by graphics-intensive gaming system. The graphics are generated and rendered at a central location and the rendered images are transmitted to user devices thereby reducing the need for high-end processors on user devices.

Wearable computing and networked devices are another emerging aspect of the computing world. These wearable devices are carried on the body of a user who wears the devices. While the wearable devices can pair with external displays, they generally include their own displays of varying sizes to present information. In certain embodiments, they are designed as eye glasses that augment an existing real world view of a user by generating overlays with appropriate information. In all the various embodiments, the wearable computing devices require users gestures such as clicking fingers, swiping on a surface or pressing buttons to execute various tasks such as turning on or off a display, starting an application, exiting an application or connecting to another device.

Wearable computing systems designed to be worn as eye pieces and methods related to such computing systems are disclosed in accordance with various embodiments described herein. The wearable computing systems are designed not only to provide passive audio-video experiences but also to provide tactile feedback in consonance with the audio-video experiences. The computing systems are also interactive in that they receive input from the user or wearer of the computing system and are responsive to the received input. In an embodiment, the input can be received by monitoring the wearer's eyes and the eye sockets which are surrounded by the flexible frame of the computing system. In an embodiment, the input can be received by monitoring the electrical signals generated in the wearer's visual cortex.

FIG. 1A is an illustration of a human user 102 employing the wearable computing system/device 100. The computing system comprises two symmetric eye pieces 104 and 106 each of which is configured to be used singly or to be used with the another symmetric eye piece. In an embodiment, both the eye pieces 104, 106 can comprise identical components. In an embodiment, the various components of the wearable computing system 100 can be distributed asymmetrically between the two eye pieces 104, 106 such that each eye piece 104, or 106 is configured for specific usage in addition to being used together for other applications. In an embodiment, the eye pieces 104 and 106 are detachably coupled to the bridging element 108 to facilitate such flexible usage. Each eye piece 104, 106 comprises a respective frame 124, 126 that includes a respective display screen 114 and 116 which when the eye pieces 104, 106 are used together form a stereoscopic display for the user 102. The frames 124, 126 are made from flexible material so that they are configured for shape-mating engagement with the eye sockets of the user 102 such that ambient light transmission is substantially blocked between the frame and the eye sockets. Thus, the frames 124/126 are configured in order to be able to conform to the shape of the eye socket of the user 102 in a manner that blocks ambient light surrounding the user 102 from leaking into the field of view of the user 102. In an embodiment, the ambient light that surrounds the user 102 can be light that is generally present in the environment with or without a visible source. Thus, if the user 102 is viewing content on the display screens 114, 116 in a virtual reality environment, the user 102 can be completely immersed in the environment and not be distracted by the view or extraneous light from environment outside of the field of view of the user 102. In an embodiment, the frames 124 and 126 can be hollow and have space within them to allow electrical interconnections between various component parts of the wearable computing system 100.

In an embodiment, display screens 114, 116 can be flexible OLED (organic light emitting diode) in order to conform to the shape of the user's 102 face along with the flexible frames 124, 126. As an OLED display works without backlight, it can be thinner and lighter than liquid crystal display (LCD) and a higher contrast ratio can be achieved in low ambient light conditions. With display screens 114, 116 that are dense enough and speakers or ear-pieces or headphones (not shown) comprising features such as noise cancelling characteristics, the user 102 can thus interact with content such as, viewing a movie or playing a video game in an environment that is as immersive as a movie theatre regardless of the actual location the user 102 may be situated in. In an embodiment, the screens 114, 116 can have variable levels of opaqueness or transparency to facilitate using the wearable computing system 100 in both virtual reality environments and augmented reality environments. Applying charge to the OLED display screens 114/116 can vary their transparency for use in different settings.

The wearable computing system 100 also additionally comprises a plurality of tactile elements 110 that provide tactile feedback to the user 102 around the eyes of the user 102 where the tactile elements 110 are in contact with the user's 102 skin. For example, a subset of the tactile elements can convert electrical energy to mechanical motion such as vibration or other forms of energy such as heat energy to provide the tactile feedback to the user 102. In an embodiment, the tactile elements 110 are small structures having varying physical characteristics that include physical and electrical connections with the frames 124/126 as will be detailed further herein. In an embodiment, at least a subset of the tactile elements 110 can be capable of independent motion. In an embodiment, all the tactile elements 110 can be employed at the same time to provide the tactile feedback or particular ones of the tactile elements 110 can be selected at any time to provide the tactile feedback to the user 102 Various kinds of tactile feedback can be provided to the user 102 based on the functionality built into the different tactile elements 110. By the way of illustration and not limitation, a first subset of the tactile elements 110 can comprise heating elements, a second set of the tactile elements can be moveable or configured for vibration at various frequencies, or a third subset of tactile elements can exert pressure. Again it may be appreciated that different tactile elements 110 can have different feedback mechanisms associated with them or all the tactile elements can each have all the tactile feedback mechanisms built into it so that combinations of different tactile elements can be used to provide a particular kind of tactile feedback.

The tactile feedback provided to the user 102 can be associated with the content so that the plurality of tactile elements 110 are activated in consonance with the displayed content such as a movie or a video game in order to add an extra dimension to the user experience. In an embodiment, the various tactile elements 110 can be mapped to various parts of an avatar (not shown) the user 102 is interacting with or associated with so that the experiences of the avatar in the virtual world can be translated to the user 102 or experienced or felt by the user 102 via the tactile elements 110. Thus, the pressure of a touch, a location of the touch and texture of the touch experienced by the avatar can be translated to the user 102 as part of the user experiences in the immersive environment of the wearable computing device 100. The avatar can additionally interact with avatars of other users and the tactile feedback provided to the user 102 can be further modified based on the interactions between the avatar of the user 102 and the avatars of the other users.

The user 102 can employ the wearable computing system 100 for displaying and interacting with various types of data such as text, images or video associated with web pages or other content such as movies or video games. In an embodiment, the content can be played from a console (not shown) that is connected to a local area network (LAN) including the wearable computing system 100. In an embodiment, the content can be streamed to the wearable computing system 100 either directly from the Internet using a communication component (not shown) built into the wearable computing system 100 or via a Wi-Fi connection with an intermediate device such as a laptop computer or a cellular phone.

In an embodiment, the wearable computing system 100 not only provides content and associated tactile feedback to the user 102 but also facilitates the user 102 interaction with the content. In an embodiment, the wearable computing system 100 comprises a detection module (not shown) that detects movement in the various parts of the eyes or eye sockets of the user 102 which facilitates the user 102 to interact with the displayed content as will be detailed further infra. In an embodiment, the detection module can include a camera and a photodiode to track movements of various parts of the user's 102 eyes. For example, movements of the user's 102 eye balls such that the user 102 glancing at a certain icon on the display screen(s) 114/116 for a predetermined time period can act as a gesture such as a mouse click that can cause the processor to execute the particular task associated with the gesture such as selecting the icon. Similarly, movement of the user's 102 eyes after such selection can cause movement of the selected icon along the direction of motion of the user's 102 eye balls and the user 102 subsequently stopping the movement at a particular second point can act to drop the icon at that particular point. The detection module can also be configured to detect finer differences or nuances in the movements of the different parts of the eye sockets covered by the wearable computing system 100 such as a user 102 or wearer closing the eyes for different time periods, squinting, raising one or more brows.

In an embodiment, the tactile elements 110 can also be configured to be part of the detection module that detects user movements even while providing tactile sensations to the user 102. The plurality of tactile elements 110 can have subsets of elements with different shapes that comprise different types of transducers collecting different vectors associated with the user's 102 eye movements or gestures of eye muscles. For example, the tactile elements 110 can also comprise transducers that are in physical contact with the facial muscles of the user 102 to detect movement in such muscles and generate corresponding electrical signals that can be fed back to the processor and the display on the display screens 114, 116 can be manipulated accordingly. In an embodiment, the location of a tactile element transmitting the electrical signal and the strength of the signal can be used to detect particular movements of the user's 102 facial muscles which can be mapped to provide particular input to the processor. Various eye movements and gestures can thus be tracked and mapped to specific types of input that can be used manipulate content is particular manner. Thus, the wearable computing system 100 can eliminate the need or complement other equipment such as joysticks or data gloves which are normally used with such wearable computing systems to receive user input.

In an embodiment, the wearable computing system 100 further comprises a thought detector (not shown) that detects thoughts of the user 102 and changes the display on the screen(s) 114, 116 based on such recorded thoughts. In an embodiment, the thought detector can comprise components that records the electrical activity of the brain via leads that contact the rear portion of the head where the virtual cortex of the brain is situated. Technologies such as EEG (electro-encephalograph), are known which provide ways of non-invasively observing human brain activity. For example, technologies such as Emotiv EPOC provided with headsets and related computer interfaces from Emotiv Lifescience can be adapted for use with the wearable computing system 100 to record thoughts and manipulate content as will be detailed further herein.

The wearable computing system 100 can additionally facilitate storing user experiences, recreating the user experiences and exchanging user experiences according to one embodiment. In an embodiment, a user experience can comprise a content item with its associated audio and tactile feedback data. This allows the user 102 to consume an item of content via the wearable computer 100, interact with the content item and change the content item to create a new content item which can be stored in one or more of a local storage device or a processor readable storage on the LAN or a remote processor readable storage on the 'cloud' which can constitute one or more servers located remotely from the user 102 and which stream content to the wearable computing device 100. Such new content items or user experiences created by the user 102 can be shared with other users. For example, a video game consumed by the user 102 can have certain tactile feedback associated with certain portions. If desired, the user 102 can change the video game to layer an additional tactile feedback and store the video game with the changed tactile feedback information as a user experience which may further be shared with other users. In an embodiment, the stored/shared user experience can comprise additional content that is obtained from external sources. For example, images or voice over obtained from other content can be added to a particular content item. In an embodiment, the new content added to a user experience can be obtained from the user's 102 thoughts by the thought detector associated with the wearable computing system 100.

Figure 1B:
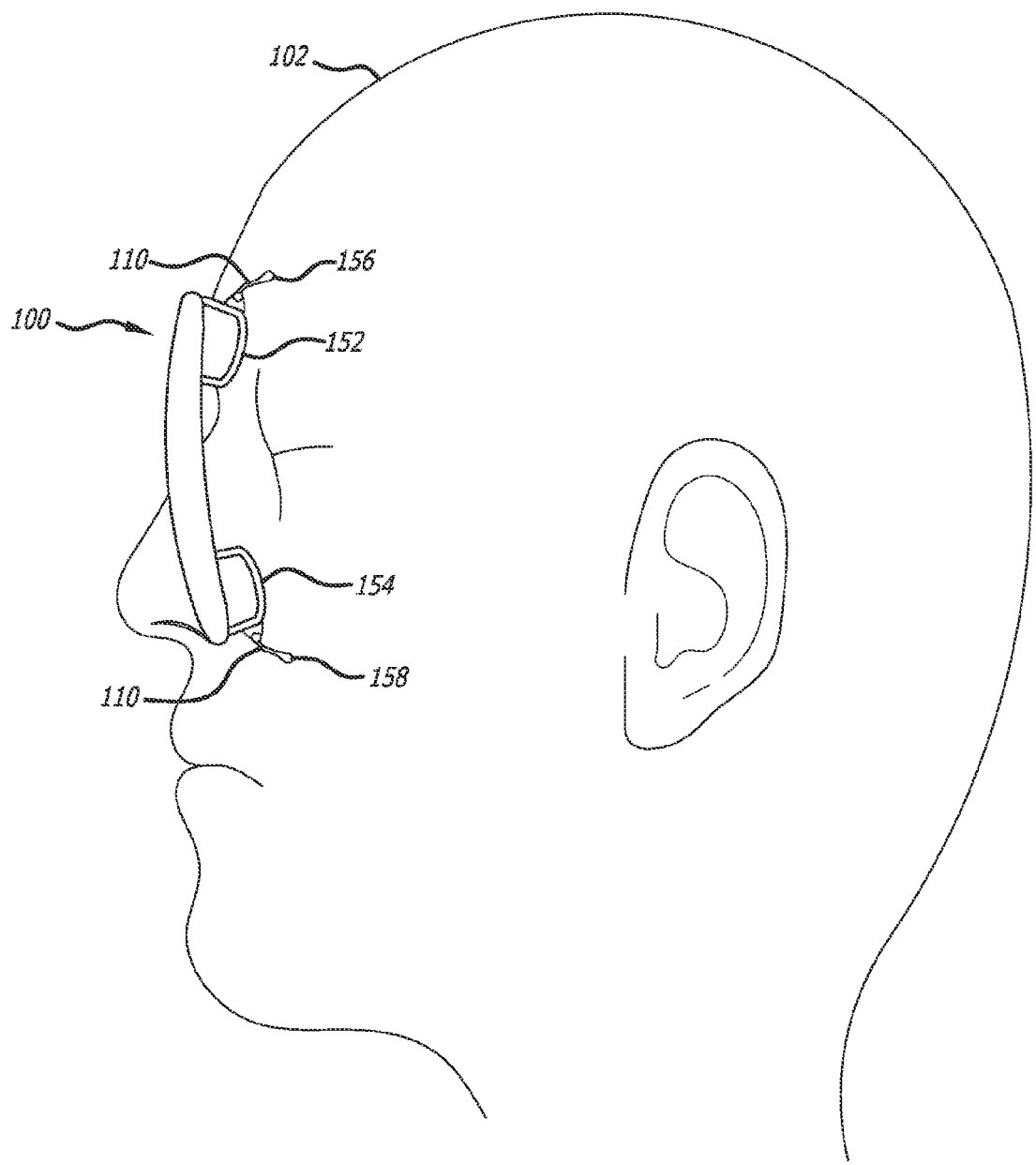
FIG. 1B shows a profile of the user with the wearable computing system.

FIG. 1B shows a profile of the user 102 with the wearable computing system 100. The wearable computing system 100 is in contact with the user's 102 skin at a plurality of points. As the wearable computing system 100 is in a shape mating arrangement with the eye socket of the user 102, the frame 126 conforms to the shape of the eye socket of the user 102 and is in contact with the user's 102 skin around the eye socket, as indicated at points 152 and 154 shown in the cross sectional profile illustrated in FIG. 1B. The shape conforming arrangement is operative to substantially block ambient light from leaking into to the field of view of the user 102. Additional points of contact include the points 156, 158 where the tactile elements 110 contact the user's 102 skin. The various tactile sensations transmitted to the user 102 via the tactile elements 110 can thus be felt by the user 102 for example, at points 156, 158.

Figure 2A:
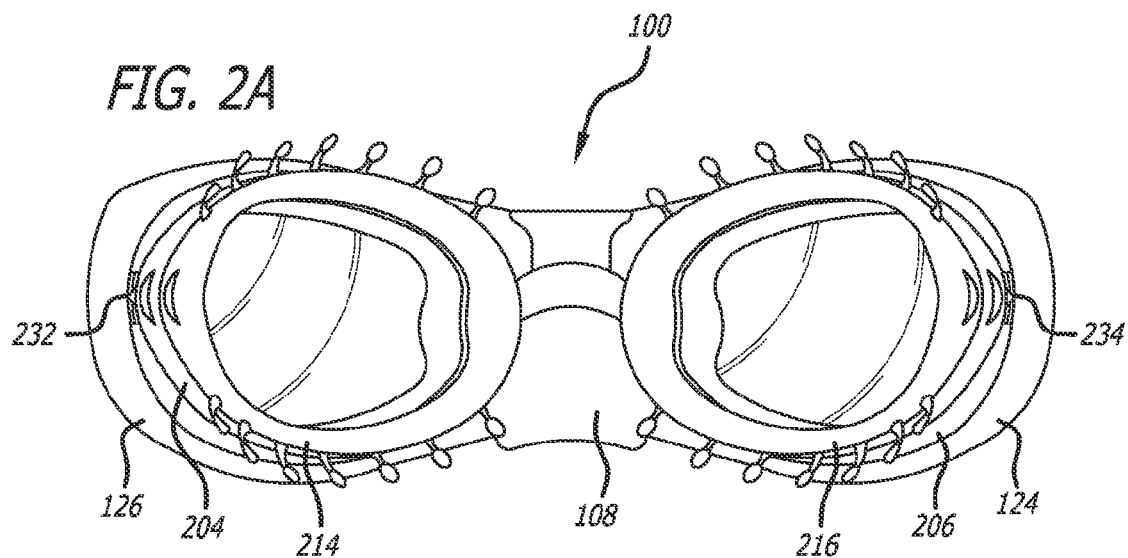
FIG. 2A is an illustration that shows another view of the wearable computing system that faces the user in accordance with embodiments of the present disclosure.

FIG. 2A is an illustration that shows another view of the wearable computing system 100 that faces the user 102 when the user 102 is wearing the wearable computing system 100 on his/her body. The flexible frames 124, 126 each includes a suction mechanism or eye gaskets 204, 206 that facilitates the wearable computing system/device 100 to be firmly attached the user's 102 face so that there is very little or no leakage of ambient light into the field of view of the user 102 or into the space between the user's 102 eyes and the screens display screens 114, 116. In addition, the wearable computing system 100 can include speakers at appropriate locations such as near the ears in order to provide acoustic feedback to the user. The wearable computing system 100 can also include within the bridging member 108, power source(s), one or more processors for executing tasks such as controlling the display screens 114, 116, providing Wi-Fi, infrared or other wireless communication, and other processing tasks such as controlling other components like the tactile elements 110 on the wearable computing system 100.

Figure 2B:
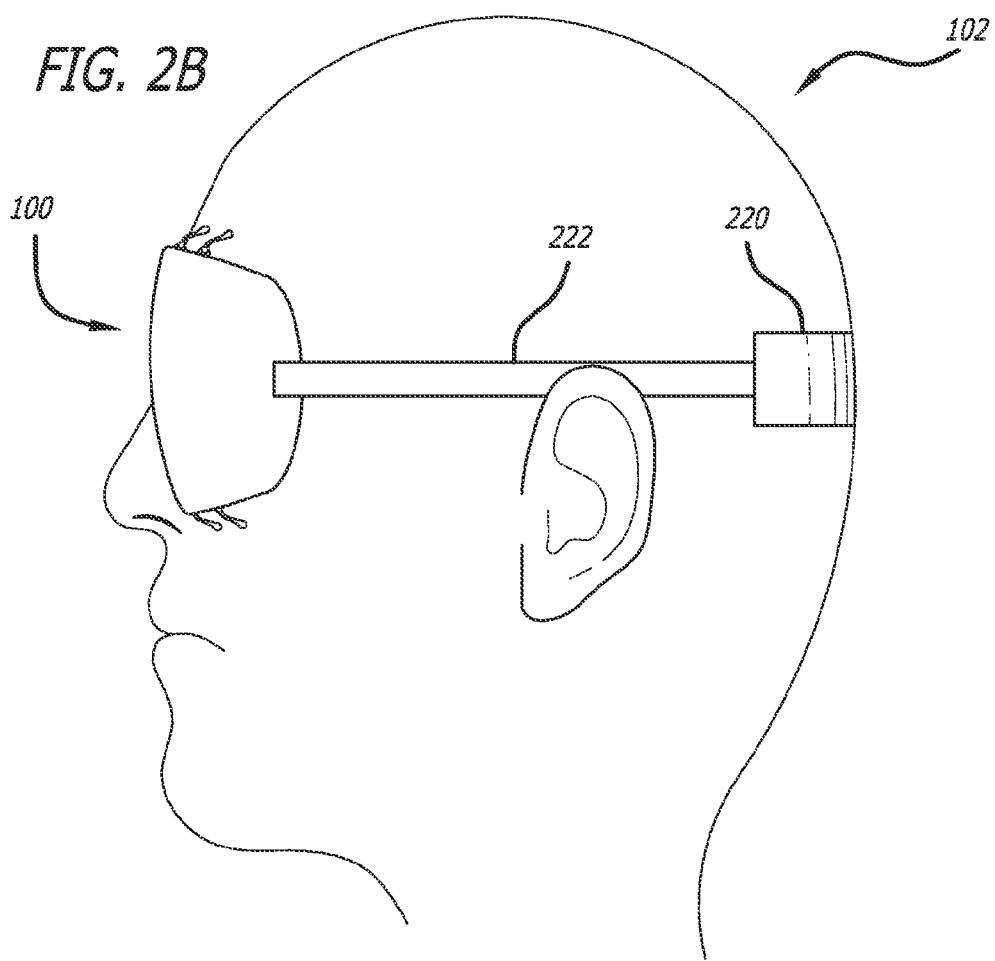
FIG. 2B is an illustration that shows a user bearing a wearable computing system that comprises visual cortex thought detector.

By the way of illustration and not limitation, FIG. 2B shows a profile of a user 102 bearing a wearable computing system 100 that comprises a visual cortex thought detector 220 which can be detachably coupled to the wearable computing system 100, for example, via a coupling means, such as a band 222. The ends of the band 222 can be detachably coupled to the ends 232 and 234 of the wearable computing system 100 in a manner that the band 222 can encircle the rear of the user's 102 head. This arrangement facilitates the visual cortex thought detector 220 to record thoughts from the visual cortex located on the rear side of the user's 102 brain. Although the visual cortex thought detector 220 is shown as one component located at one part of the wearable computing system 100 and in contact with a single portion of the user's 102 brain, it may be appreciated that this is not necessary. The visual cortex thought detector 220 can include a plurality of sensors that can be in contact with a plurality of portions of the user's 102 brain as needed to collect thought information.

In an embodiment, technologies available for EEG (electroencelphalogram) can be employed within the visual cortex though detector 220. Brain cells talk to each other by exchanging tiny electrical signals and an EEG is a non-invasive procedure employed in the medical field for recording such electrical activity. A number of electrodes are placed at different points on the scalp of a person to detect voltage fluctuations caused by ionic flow of current between the brain cells. Experiments have found that when people visually imagine something their eyes move in the a manner that they would move if they were actually looking at the object of their imagination. For example, if a person imagines a skyscraper, the person's eyes move in a top-down manner. Similarly if the person imagines a train, the person's eyes would move side to side. The occipital cortex (also called the visual cortex), at the back of the head is one of the first areas of the human brain where information coming in from the user's 102 eyes arrives and where a lot of work of understanding what the user 102 is seeing goes on. Experiments related to the brain activity also reveal that the visual cortex of the brain is particularly active when people imagine or look at an object in their mind's eye. The visual cortex thought detector 220 is therefore placed at the rear of the user's 102 head near the visual cortex. However, the wearable computing system 100 can have additional electrodes located relative to other parts of the brain to collect information from such parts to detect the user's 102 imagined thoughts and/or images and employ it in manipulating the display of the wearable computing system 100.

Figure 3:
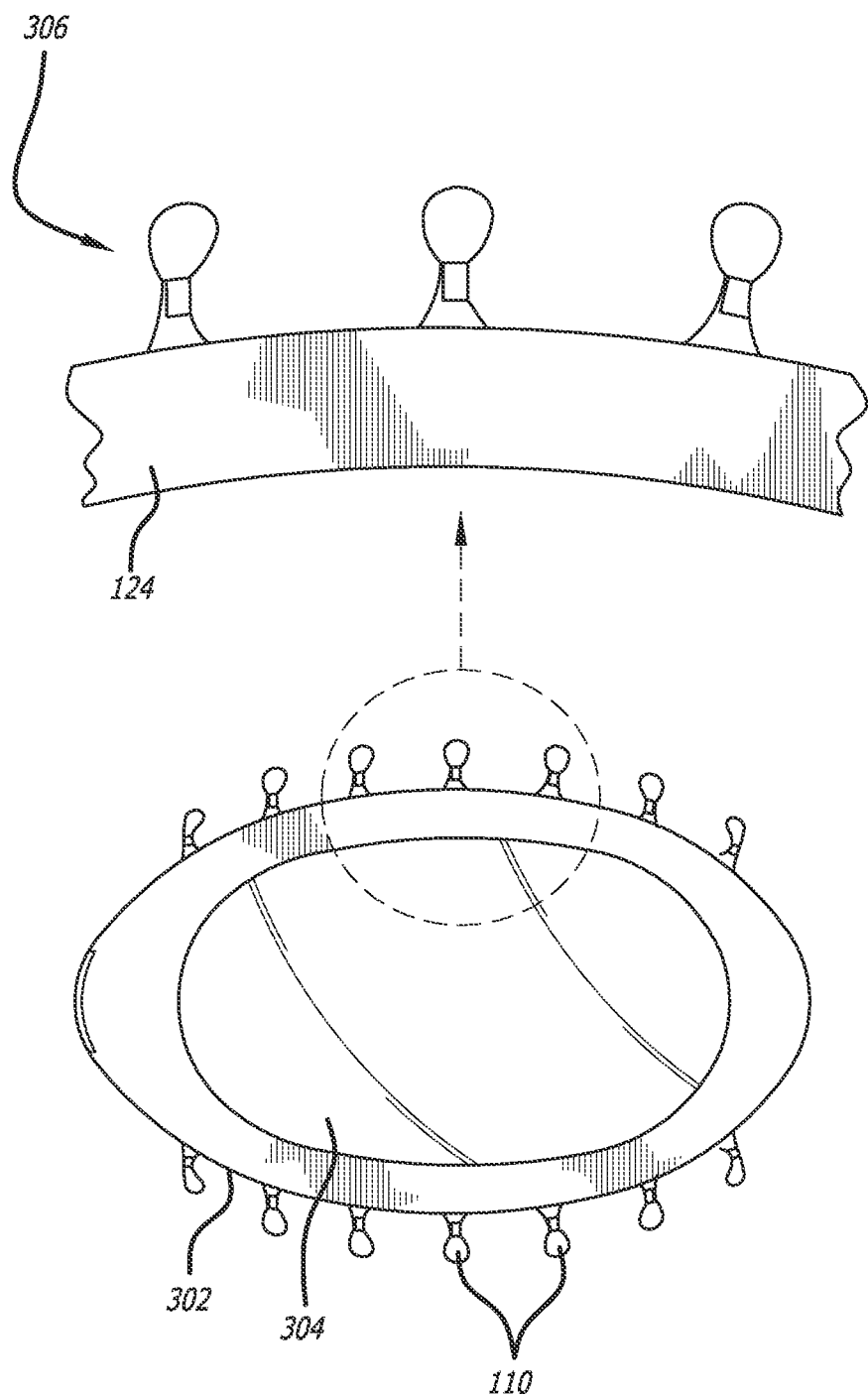
FIG. 3 is an illustration that shows some example details of the tactile elements 110 in accordance with embodiments of the present disclosure.

FIG. 3 is an illustration that shows some example details of the tactile elements 110. The plurality of tactile elements 110 are arranged along the occular ring structure 302 comprised within the eye gaskets 204, 206 along a perimeter of the aperture 304. When one of the eye gaskets 204, 206 is used in the wearable computing system 100, the aperture 304 would include a display screen 114/116. The plurality of tactile elements 110 can have different structural details in order to provide different tactile sensations. By the way of illustration and not limitation, different tactile elements can be made of different materials, bent at different angles as shown in the close up view 306 of the occular ring 302 or have different contact surfaces. Such variability in the structures of the tactile elements 110 facilitates generating different pressure levels or providing different areas of contact or different textures associated with the feelings provided by the tactile feedback given to the user 102. In an embodiment, different ones of the tactile elements 110 may have different shapes and can be arranged in different ways on the frames 124/126. For example, the tactile elements 110 can be arranged such that the lengths of the tactile elements 110 vary gradually from one tactile element to an adjacent element or the angle of inclination of the tactile elements can vary gradually as shown on the frame 124 at 306.

Figure 4:
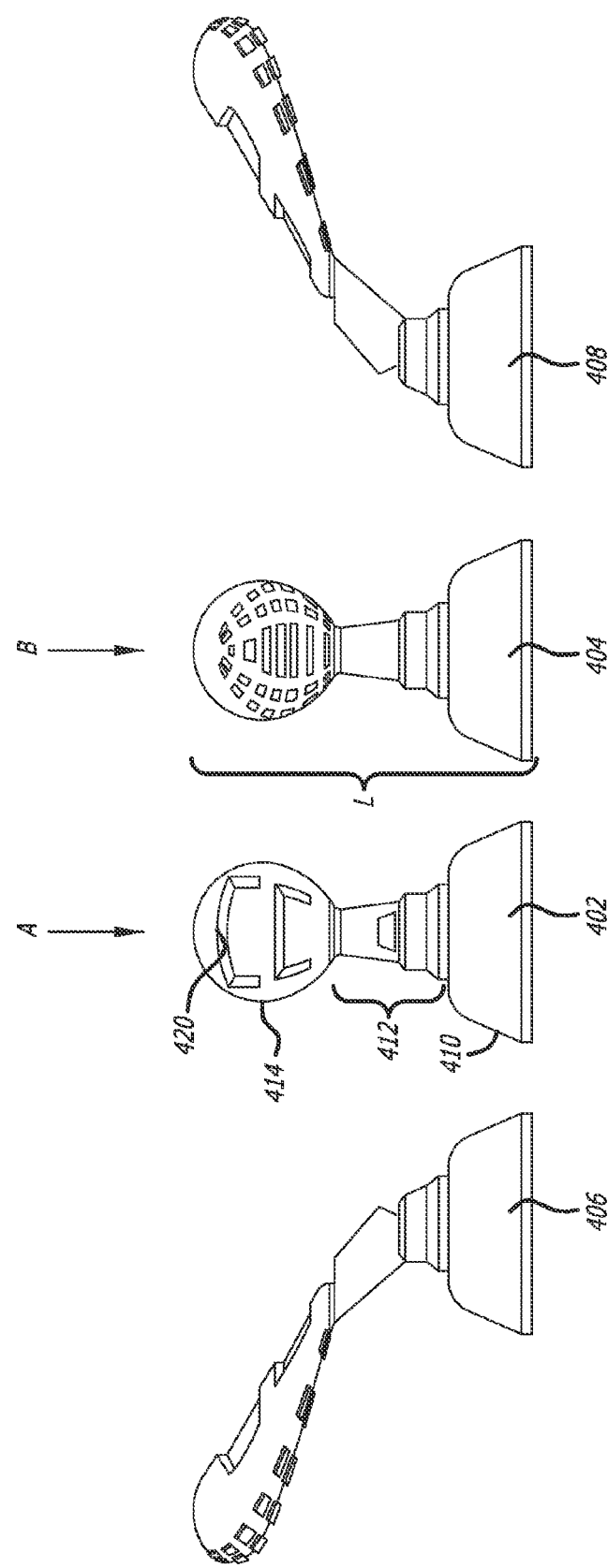
FIG. 4 illustrates various views of the tactile elements in accordance with embodiments of the present disclosure.

FIG. 4 illustrates various views of one 400 of the tactile elements 110 in accordance with embodiments of the present disclosure. In different embodiments, the tactile elements 110 can be made from elastic polymers or metals or combinations thereof such as metal arms coated with polymer skin padded with gels that include certain level of elasticity to not only withstand the vibrations that are generated while providing the tactile feedback but also to transmit the vibrations generated by the user 102 as different types of user input.

The views 402, 404, 406 and 408 together show an all round view of one of the tactile elements 110. In particular, 406 and 408 are cross sectional views of 402 and 404 as seen from point of views A and B respectively. Each tactile element 400 has a base portion 410, a neck 412 and a head 414. In an embodiment, the entire length of the tactile element 400 from center of the base portion 410 to the tip of the head 414 can approximately vary between 1-3 centimeters. In an embodiment, different tactile elements can have different lengths based on their location on the frames 124/126 and the area the tactile elements are supposed to contact. The base portion 410 connects the tactile element 400 to the frame 124/126 of an eye piece 104/106. In an embodiment, the base portion 410 is hollow in order to allow coupling the tactile element 400 electrically to other parts of the wearable computing system 100 such as the processor(s) in the bridge portion 108. Thus, the base portion 410 not only facilitates physically connecting the tactile element 400 to the frame 124/126, but also facilitates electrically coupling the tactile element 400 to other parts of the wearable computing system 100.

The neck portion 412 connects the base portion 410 to the head 414 of the tactile element 400. Different tactile elements 110 can have different lengths associated with the neck portion. Various tactile elements 110 can also have their necks bent at different angles in order to vary the kind sensation provided to the user 102 as tactile feedback. In an embodiment, the neck 412 can also be hollow in order to electrically couple the head 414 to other parts of the wearable computing system 100. In an embodiment, the neck 412 can be a solid structure connecting the head 414 to the base portion 410.

The head 416 of the tactile element 400 is the part that is in contact with the user's 102 skin in order to provide the tactile feedback. In an embodiment, the head 416 can be made of similar materials as the other portions of the tactile element 400 but can be configured with a specific pattern 420 to provide a particular type of sensation on the user's skin. Different patterns can be formed on the head portions of different tactile elements as shown for the head portions of the tactile elements 110. In an embodiment, the head 416 can be configured of a different material than the other parts of the tactile element 400. In an embodiment, the head 416 can be made of the same material as the remaining portions of the tactile element 400 but can be coated or covered with another material. In an embodiment, the head portions of different tactile elements 110 can be configured according to different embodiments thereby creating various types of touch sensations.

As described supra, the tactile elements 110 can also be part of the system to detect movements of facial muscles of the user. By the way of illustration and not limitation, movements in the user's 102 skin can cause movements of the tactile elements 110. The attributes of user's 102 reaction, such as, strength and duration of movements of the facial muscles can thus be detected and recorded. Different feedback, comprising one or more of visual, audio or tactile modes can be provided based on the attributes of the user movements.

Figure 5:
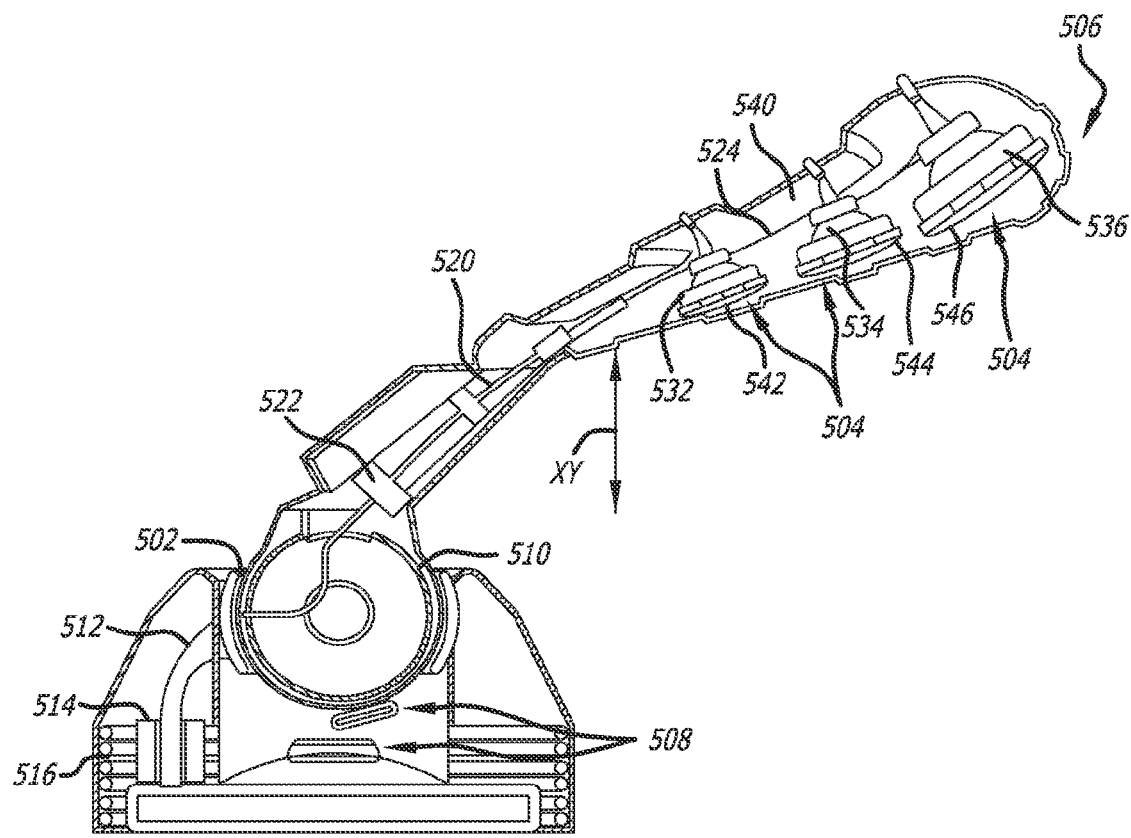
FIG. 5 is a schematic diagram showing a cross section of one of the tactile elements 110 in accordance with embodiments of the present disclosure.

FIG. 5 is a schematic diagram showing a cross section of one of the tactile elements 110, for example, 400 in accordance with embodiments of the present disclosure. As described supra, the tactile element 400 comprises a hollow base portion 410, a neck 412 and a head 414. The base portion 410 not only connects the tactile element 400 to a frame of an eye piece 102/104, but it also houses the actuation mechanism. The actuation mechanism can be configured in a bi-directional manner so that it not only provides tactile feedback to the user 102 but also collects user input via various movements executed by the user's 102 muscles around the eyes. The neck 412 connects the base to the head 414 so that the head 414 can be actuated to provide an appropriate tactile feedback or conversely, the movements of the head 414 can be detected to record the necessary attributes of the user input.

In accordance with an embodiment, the actuation mechanism comprises a signal contact plate 502 that is in a form-fitting contact with a spherical body 510 to form a ball and socket joint. The spherical body 510 is not only capable of freely rotating along the various axes passing through A but can also tilt along the different axes within the signal contact plate 502. A pair of magnets 508 together with the electrical coil 516 provide mechanical actuation for the rotating spherical body 510 when current is passed through the coil 516. One magnet of the pair 508 is attached to the rotating sphere 510 while the other magnet is fixed to the bottom of the base 410. Conversely, the pair of magnets 508 also serve to induce current in the coil 516 when the rotating sphere 510 is moved due to the mechanical motion of the head 414 and the neck 412 caused by user input such as, the user 102 moving the muscles in the eye socket which are in contact with the tactile element 400.

A connecting wire 520 including ribs 522 is attached to the rotating sphere 510 and runs through the length of the neck 412 and at least part of the head 414 portion interconnecting the various elements therein. Rotating the sphere 510 within the signal contact plate 502 by passing the current through the coil 516 therefore pulls or pushes the connecting wire 520 thereby actuating the neck 412 and the head 414 along the vertical axis XY. In addition to providing mechanical actuation, the connecting wire 520 can also include electrical connections for the speaker array 504.

In an embodiment, the speaker array 504 can comprise of one or more speakers 532, 534 and 536 that are configured to provide tactile feedback, such as vibrations. In an embodiment, the transmitted vibrations facilitate bone conduction so that audio feedback can also be provided through one or more of the speakers in the array 504. It can be appreciated that the speakers 532, 534 and 536 can be configured for audio feedback via bone conduction based on the location of the tactile elements 110. For example, tactile elements 110 in contact with softer muscle portions of eye sockets, such as, under the eyes may not be configured for audio feedback via bone conduction whereas tactile elements located on the upper part of the frames 124/126 that contact the brow or the bony nose bridge of the user 102 can be configured for bone conduction according to embodiments described herein. The different speakers 532, 534 and 536 can vary in sizes and power attributes to provide a variety of tactile vibrations based on the power and area of contact of each of the array of speakers 504. In an embodiment, the head 414 can be made up of plastic and/or metal combination in the portion 540 which is not in contact with the user's 102 skin while the faces of the speakers 542, 544 and 546 are arranged within a gel pad 506 in order to provide a softer feel for the user 102. In an embodiment, the gel pad 506 can comprise additional elements such as, heating elements (not shown), to provide additional types of tactile feedback to the user 102.

It may be appreciated that the structures in FIG. 4 and FIG. 5 are only shown by the way of illustration and not limitation and that the tactile elements 110 can be configured to have other structures in accordance with embodiments detailed herein. For example, the tactile elements 110 can be configured as protrusions on the frames 124, 126 comprising spherical or cylindrical or other shapes. In an embodiment, different ones of the plurality of tactile elements 110 may have different shapes and can be arranged in different ways on the frames 124/126 as discussed supra. In an embodiment, the tactile elements 110 can comprise electrical suction cups to provide a particular type of tactile feedback by pulling the skin of the user 102. In an embodiment, the tactile elements 110 can comprise tiny pin holes located on the frames 124/126.

Figure 6:
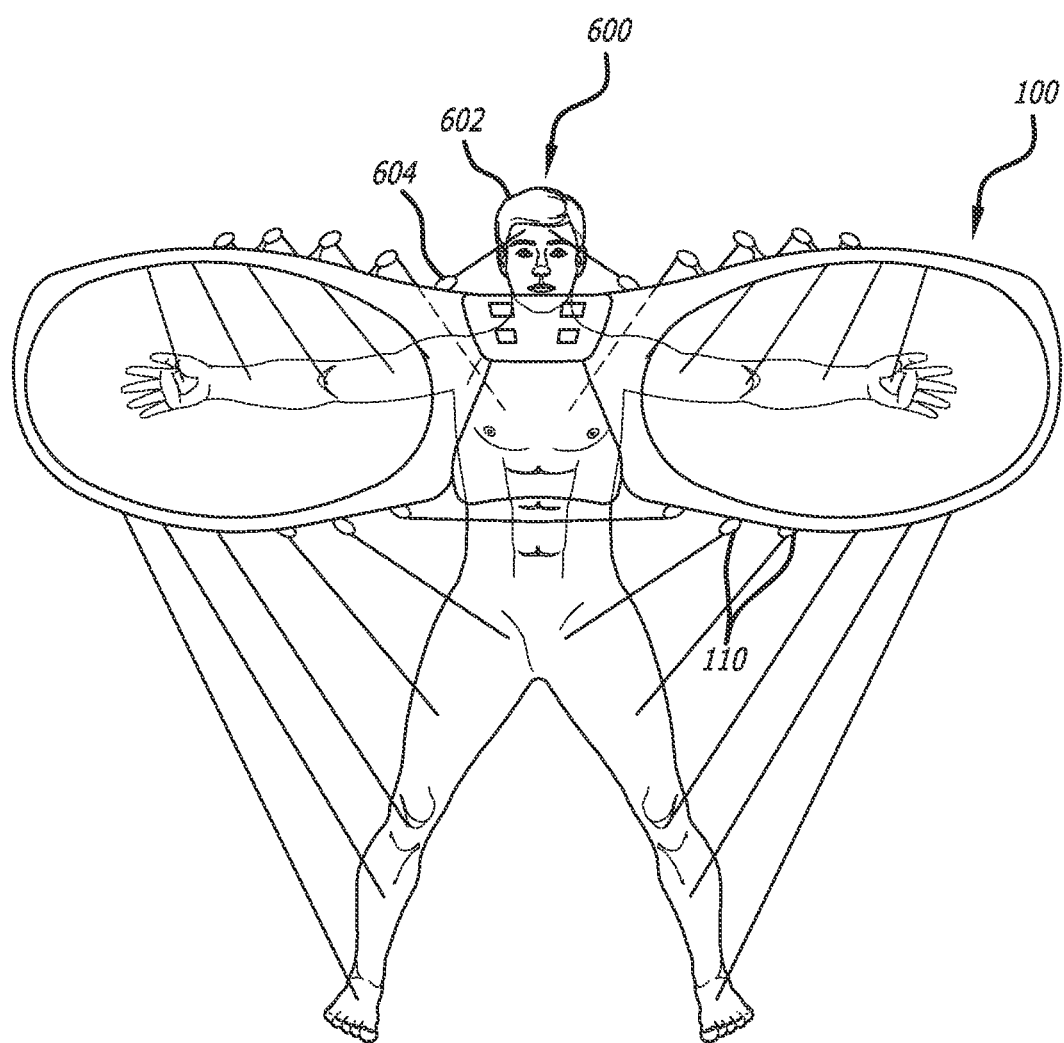
FIG. 6 is an illustration that shows the plurality of tactile elements providing to the user, tactile feedback that is synchronous with a particular display that comprises an avatar in accordance with embodiments of the present disclosure.

FIG. 6 is an illustration that shows the plurality of tactile elements 110 providing to the user 102, tactile feedback that is synchronous with a particular display that comprises an avatar 600. In this embodiment, each of the plurality of tactile elements 110 are mapped to provide tactile feedback associated with, for example, the virtual-world experiences of the avatar 600 that may be associated with the user 102. Each of the plurality of tactile elements 110 is associated with a certain one of the body parts of the avatar 600 so that if a particular body part such as, the head 602 of the avatar 600 experiences a particular sensation in the virtual world as seen by the user 102 on one or more of the display screens 114 and 116, then the tactile element 604 mapped to the head 602 is activated to give a tactile feedback to the user 102 at the point of contact between the tactile element 604 and an area above the user's 102 right eye. For example, if the avatar 600 touches an object with the portion 602 of his head, the tactile element 604 can be activated to apply pressure on the user's 102 brow at the point of contact. Similarly, the avatar's 600 experiences of heat, pressure, or touch of another living being or non-living entity or other physical sensations can be provided to the user 102 via appropriate activation of the one or more tactile elements 110. It may be appreciated that a human avatar 600 is shown only by the way of illustration and that the plurality of tactile elements 110 can be mapped to other living or non-living avatars and the virtual-world experiences of such avatars can be relayed to the user 102 not only via visual or audio channels but also as tactile sensations through the tactile elements 110. This can facilitate providing user 102 with tactile sensations associated with other living beings such as flying of a bird or sensations associated with non-living entities such as racing of a car.

In an embodiment, the avatar 600 can be made to interact with the virtual world displayed on the screen(s) 114/116 via the movement of the eyes and gaze tracking of the user 102. For example, the user 102 staring at the avatar 600 for a predetermined time period can facilitate selection of the avatar 600 for interaction. Similarly, moving the gaze in a particular direction subsequent the selection can move the avatar 600 appropriately and resting the gaze at a point for a predetermined time can fix the avatar 600 at the location where the user's 102 gaze is resting or raising the user's 102 eye brows can cause the avatar 600 to jump. As the eyes move rapidly, the time periods associated with the aforementioned user gestures can be around the order of a few seconds. The tactile feedback and gesture mappings can be programmed into the content that is provided by the wearable computing system 100. For example, video game applications or movies can be created for the wearable computing system 100 that comprise tactile feedback and user interaction mechanisms built into them.

In an embodiment, where the computing system 100 display the avatar 600 comprises a visual cortex thought detector 220, the avatar 600 can be manipulated based on input provided by the visual cortex though detector 220. As described supra, the electrical signals generated by the visual cortex of the user 102 can be detected and interpreted to change the state of the avatar 600 accordingly. By the way of illustration and not limitation, the avatar 600 can be moved up or down or side ways or size of the avatar 600 can be changed based on the input from the visual cortex thought detector 220.

Figure 7:
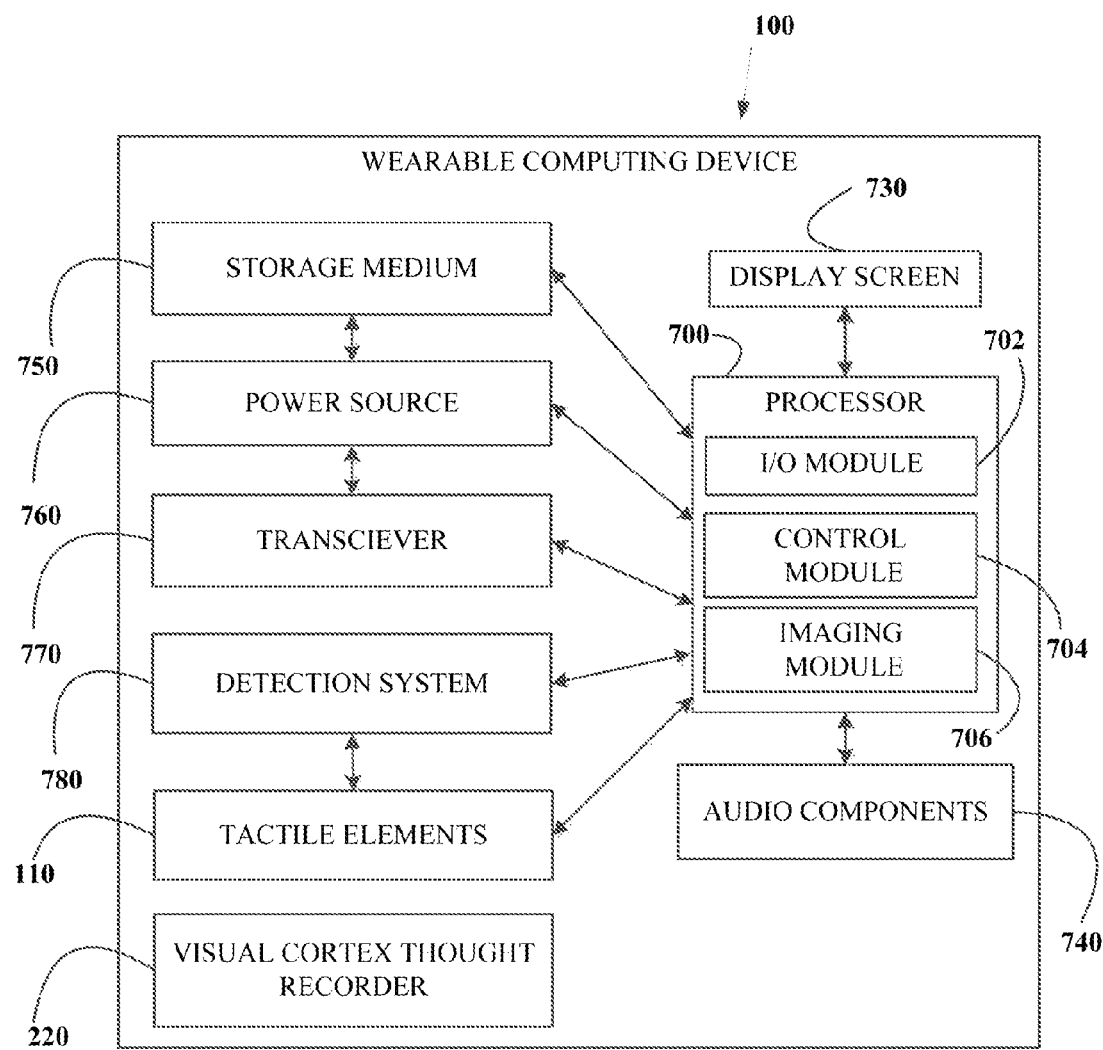
FIG. 7 is a block diagram depicting certain example modules within the wearable computing device in accordance with embodiments of the present disclosure.

FIG. 7 is a block diagram depicting certain example modules within the wearable computing device 100 in accordance with an embodiment. It can be appreciated that certain embodiments of the wearable computing system/device 100 can include more or less modules than those shown in FIG. 7. The wearable computing system 100 comprises a processor 700, tactile elements 110, display screen 730, a visual cortex thought detector 220, audio components 740, storage medium 750, power source 760, transceiver 770 and a detection module/system 780. While the schematic diagram FIG. 7 the wearable computer system 100 is shown as comprising a single eye piece since one display screen 730. However, the wearable computing system 100 can include two eye pieces with a display screen each which may each have all the modules disclosed herein or the eye pieces can be configured to be used together and can include each one of the aforementioned modules in order to avoid duplication of modules.

The wearable computing system 100 can be configured to include the processor 700 at an appropriate location, for example, at the bridging element 108. The processor 700 further comprises by the way of illustration an input/output (I/O) module 702, a control module 704 and an imaging module 706. Again, it can be appreciated that although only one processor 700 is shown, the wearable computing system 100 can include multiple processors or the processor 700 can include task-specific sub-processors. For example the processor 700 can include a general purpose sub-processor for controlling the various equipment comprised within the wearable computing system 100 and a dedicated graphics processor for generating and manipulating the displays on the display screen 730. The I/O module 702 comprised within the processor 700 can be configured to receive different types of inputs from various components such as user gesture input from the detection system 780, user thought input from visual cortex thought detector 220, or audio inputs from audio components 740 such as a microphone. The processor 700 can also receive inputs related to the content to be displayed on the display screen from local storage medium 750 or from a remote server (not shown) via the transceiver 770. The processor 700 can additionally receive input from the tactile elements 110 regarding movements of the user's muscles which are monitored by the tactile elements 110 as part of the detection system 780. The processor 700 is also configured to provide appropriate outputs to different modules of the wearable computing system 100 and other networked resources such as the remote server (not shown).

The various inputs thus received from different modules are processed by the appropriate programming or processing logic within the control module 704 of the processor 700 which provides responsive output as will be detailed further infra. The programming logic can be stored in a memory unit that is on board the processor 700 or the programming logic can be stored in an external processor readable storage device/medium 750 and can be loaded by the processor 700 as required. In an embodiment, the processor 700 can execute programming logic to display content streamed by the remote server on the display screen 730 in addition to tactile element control logic to activate relevant ones of the tactile elements 110 in an appropriate manner and provide tactile feedback to the user in synch with the displayed content. The commands related to the activation of the tactile elements 110 can be provided with the content from the remote server and the tactile element control logic stored on the storage medium 750 and executed by the processor 700 can interpret the commands to activate the tactile elements 110 appropriately.

In an embodiment, an imaging module 706 also comprised within the processor can include programming logic such as a display manipulation logic executed by the processor 700 in order to create or manipulate a display based on the input obtained from one or more of the detection system 780 and the visual cortex thought detector 220. The input received from the detection system 780 relates to eye tracking and movements of muscles around the eyes of the user 102. Based on the direction of motion of the eye balls or direction and force of the movements of muscles around the eyes, the display manipulation logic of the imaging module 706 can execute various tasks that would normally be executed by a mouse or a joystick or other user input mechanism. Thus, the user 102 can execute tasks associated with a computing device such as generating text or image data by moving his/her eyes or muscles around the eyes.

In a further embodiment, the imaging module 706 can be employed to change an existing display, generate new elements in a display based on input received from the visual cortex thought detector 220. For example, the user 102 can imagine a geometric pattern with a particular color with his/her eyes closed. While the detection system 780 may not be able to provide user input to the processor 700 with the user's eyes closed and no muscle movements, the visual cortex thought detector 220 can obtain information regarding the user's 102 imagination and the imaging module 706 can execute be employed to show the user's imagination on the display screen 730. In an embodiment, the imaging module 706 can execute programming logic to recreate the user's 102 imagination on the display screen 730. In an embodiment, the input from the visual cortex thought recorder 220 can be transmitted by the transceiver 770 to a remote server (not shown) where such input is interpreted and a display based on such input is created and transmitted back to the wearable computing system 100. In this case, the imaging module 706 is employed to show such received display to the user 102 on the display screen 730. In an embodiment, the I/O module 702 can be further configured to store such user experiences/imaginations that are obtained by the visual cortex detector 220 on a local storage device 750 or a remote server (not shown).

Figure 8:
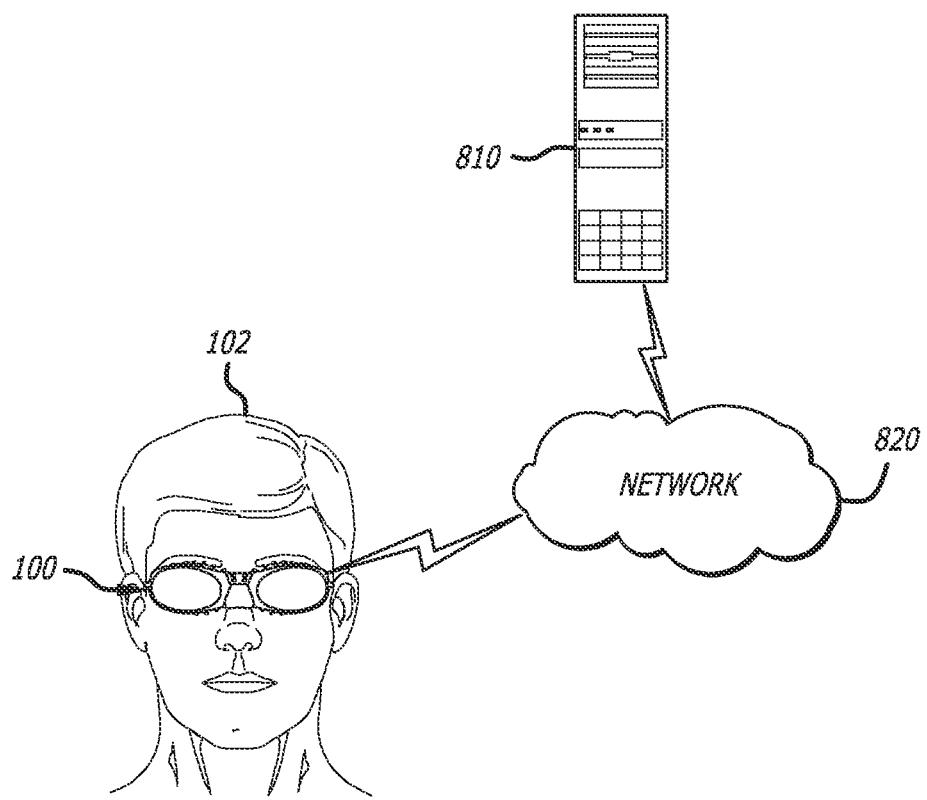
FIG. 8 shows a schematic figure of the wearable computing device communicating with a remote server in accordance with embodiments of the present disclosure.

FIG. 8 shows a schematic figure of the wearable computing device 100 communicating with a remote server 810. The transceiver 770 included in the wearable computing device 100 facilitates communication of the wearable computing device 100 with the remote server 810 via a network cloud 820. The remote server 810 can be configured to execute various tasks as detailed herein in accordance with different embodiments. The wearable computing device 100 in an embodiment, streams content from the remote server 810 which can include audio/video (AV) content that has associated therewith synchronous tactile feedback information. The processor 700 not only displays the streamed AV content but also activates the tactile elements 110 to provide different types of sensations to the user 102. The wearable computing system 100 is also configured to detect user feedback and execute tasks such as manipulating the display or storing the manipulated display in a local storage of the wearable computing system 100 or transmitting the user feedback to the remote server 810 for further processing or storage.

Figure 9:
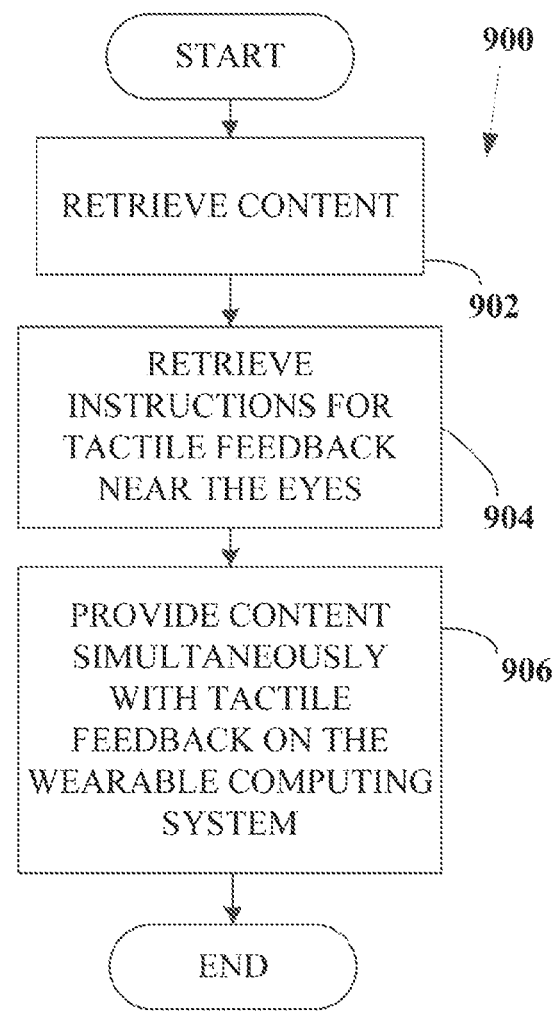
FIG. 9 shows a flowchart illustrating an embodiment of a method of providing content to the user as executed by the wearable computing device in accordance with an embodiment.

FIG. 9 shows a flowchart 900 illustrating an embodiment of a method of providing content to the user 102 as executed by the wearable computing device 100. The method begins at 902 with providing content to the user 102 via the display screen(s) 114/116 and/or the audio components 740. In different embodiments, the content provided to the user 102 can comprise one or more of audio and video content associated with tactile feedback data. The content can be retrieved from a local storage device 770 or a remote server 810 according to embodiments described herein. The instructions to provide tactile feedback are also retrieved along with the content at 904. The retrieved content is provided to the user 102 and simultaneously the tactile feedback is provided to the user via activation of the appropriate tactile elements 110 as shown at 906. Various sensations of pressure, heat, prolonged or fleeting sensations of touch with living and non-living entities can be provided at 906 by activation of the tactile elements 110 according to embodiments described herein.

Figure 10:
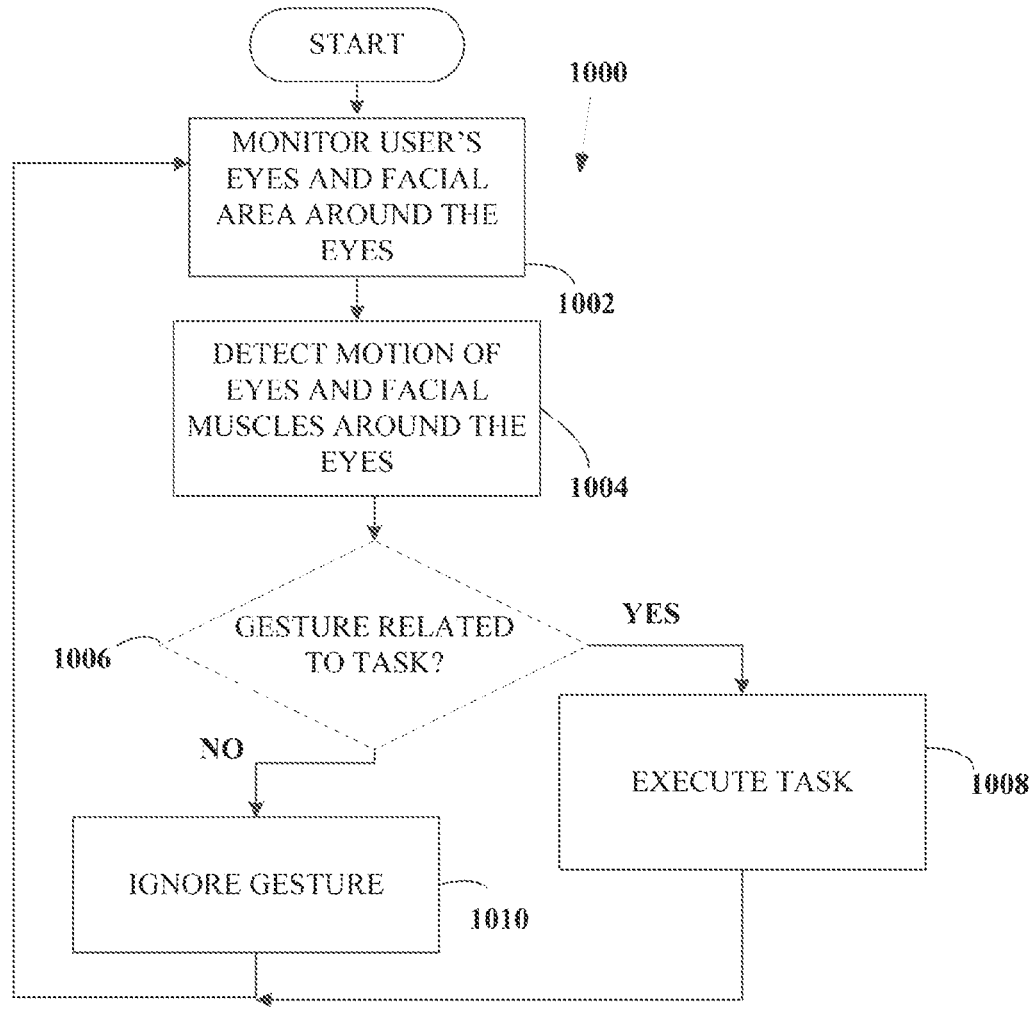
FIG. 10 shows a flowchart illustrating an embodiment of a method of providing interactive content to the user as executed by the wearable computing device in accordance with an embodiment.

FIG. 10 shows a flowchart 1000 illustrating an embodiment of a method of providing interactive content to the user 102 as executed by the wearable computing device 100. This method can be executed in conjunction with the method described above in FIG. 9. The method begins at 1002 with observing or monitoring the movement of the user's 102 eyes and facial movements around the user's eyes using detection modules/systems 780 described herein. The motion of the eyes and/or eye gestures are detected as shown at 1004. At 1006 it is determined if the movement of the user's 102 eyes is mapped to specific task-related gestures. Such gestures can include without limitation closing eyes for a predetermined time period, widening the eyes, moving eyes at a particular speed in a specific direction, staring hard at an icon, raising one or both the eyebrows, squinting or combinations thereof. For example, in the case of combination of gestures, the user 102 staring at an object on the screen(s) 114/116 for a predetermined time period can cause the object to be selected and subsequently moving the eyes in a particular direction can cause the object to be moved on the screen in the corresponding manner. Some of the gestures can be inadvertant or involuntary motion which does not reflect any user intention. The wearable computing system 100 can be configured to differentiate such involuntary gestures from intentional gestures by for example, associating particular gestures with predetermined time periods. If it is determined at 1006 that particular gestures are related to specific task(s), such tasks are executed by the wearable computing device 100 in response to the detected eye gestures or eye motion at 1008 else, the gesture or motion is ignored as shown at 1010. In either case, the wearable computing system 100 continues to monitor user movements at 1002.

Figure 11:
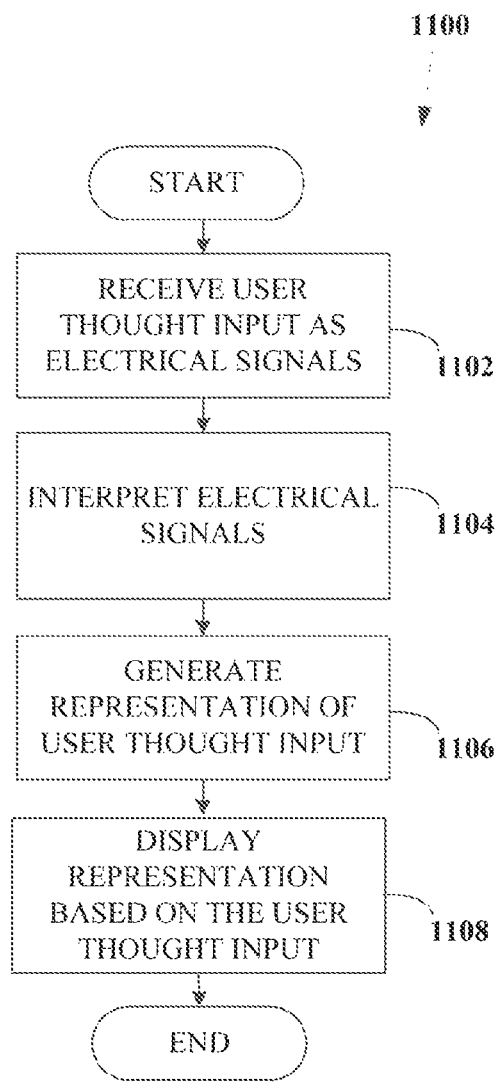
FIG. 11 shows a flowchart illustrating an embodiment of a method of providing interactive content to the user as executed by the wearable computing device in accordance with an embodiment.

FIG. 11 shows a flowchart 1100 illustrating an embodiment of a method of providing interactive content to the user 102 as executed by the wearable computing device 100. The method begins at 1102 with the wearable computing system 100 receiving user thought input. The visual cortex located at the rear of the user's 102 head is capable of producing visual representations. If an instrument that records electrical signals from the visual cortex of the user's 102 brain is placed at the rear of his/her head, a graphical representation of the user's 102 imagined pattern or pattern visualized in the user's brain can be generated. Thus, the user 102 can execute tasks such as generating text input just by visualizing the appropriate letters and the wearable computing system 100 will be able to detect and generate a text document that is visualized by the user 102. Similarly, the user 102 can visualize patterns, colors or other graphics which can be detected and reproduced by the visual cortex thought detector 720. For example, the user 102 can visualize a vertical movement of an avatar and based on the electrical signals from the user's 102 brain, the avatar can be moved accordingly. The electrical signals are interpreted or decoded as shown at 1104 to obtain pattern and/or color information associated with the user's 102 thought input as obtained by the visual cortex thought detector 720. A graphical representation of the user's 102 imagination is generated at 1106 and displayed on the display screen(s) 114/116 as shown at 1108.

In an embodiment the method of FIG. 11 can be used in conjunction with the method outlined in FIG. 9. Content with or without tactile feedback can be provided to the user 102 via the wearable computing system 100 as detailed in FIG. 9 and the user's 102 imagination can be used to alter the provided content as detailed in FIG. 11. The content changed in accordance with the user's 102 imagination can be displayed on the display screen(s) 114/116.

In an embodiment, the functionality of the visual cortex thought detector 720 can be distributed across network 820 so that only the detection of electrical signals from the user's 102 visual cortex is performed by the visual cortex thought detector 720 of the wearable computing system 100 while the remaining tasks such as interpretation of the signals, reproduction of the user's 102 imagination and generation of the graphics from the detected signals are performed at the server 810. The graphics thus generated can be transmitted back to the wearable computing system 100 by the server 810 for display on the screen(s) 114/116.

Figure 12:
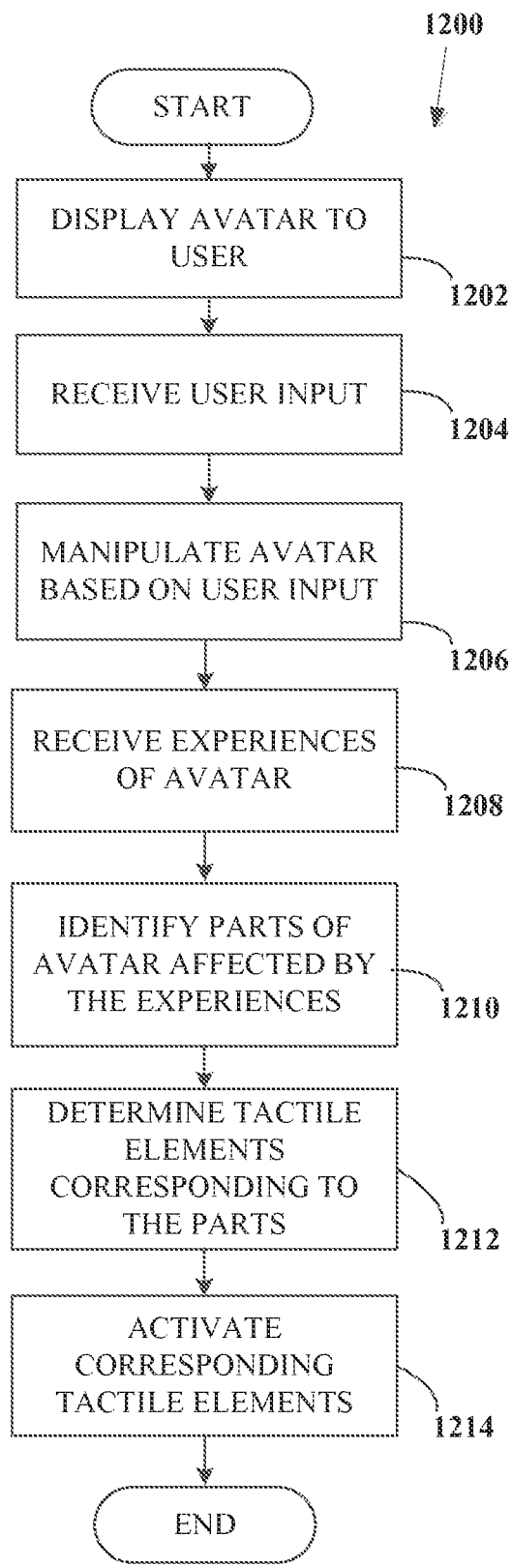
FIG. 12 shows a flowchart 1200 illustrating an embodiment of a processor-executable method of providing tactile feedback that is synchronous with a display comprising an avatar.

FIG. 12 shows a flowchart 1200 illustrating an embodiment of a processor-executable method of providing tactile feedback that is synchronous with a display comprising an avatar 600. The method begins at 1202 wherein a display comprising an avatar 600 is shown to the user 102 and user input to manipulate the avatar 600 is received at 1204. As described herein, inputs from various modules such as, the detection system/module 780, can be employed to manipulate the avatar 600. The avatar 600 is manipulated based on the user input at 1206. For example, the user 102 can move his eyes in a manner that moves the avatar 600 in a particular direction. The experiences of the avatar 600 when manipulated based on the user input are received at 1208. For example, the avatar 600 may come into physical contact with an object in the virtual world when moved based on the user input as described supra. The parts of the avatar 600 affected by such experiences are identified at 1210 and the tactile elements of the plurality of tactile elements corresponding to the affected parts of the avatar 600 are determined at 1212. Based on the experiences of the avatar 600 the corresponding tactile elements can be activated at 1214. In different embodiments, the plurality of tactile elements 110 can be activated or a subset of the plurality of tactile elements 110 can also be activated. In a further embodiment, different tactile elements can be activated in unique ways to provide various tactile sensations to the user 102.

It can be appreciated that in an embodiment, the process described in flowchart 1200 can be executed by the wearable computing system 100. In an embodiment, the process described in the flowchart 1200 can be executed by the wearable computing system 100 in conjunction with a remote server 810. For example, the wearable computing system 100 can be operable to provide the display at 1202, collect the user input at 1204, and manipulate the avatar as shown at 1206. The collected user input can be transmitted to the remote server 810 which receives the experiences of the avatar 600 at 1208, identifies the parts of the avatar 600 affected by the input at 1210 and determines the tactile elements corresponding to the affected parts at 1212. In this embodiment, the remote server 810 can transmit instructions to the wearable computing system 100 to activate the tactile elements corresponding to the affected parts as shown at 1214.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A system comprising:
   a wearable eye piece comprising:
   a wearable eye piece comprising:
   a flexible frame configured for shape-mating engagement with an eye socket of a human wearer such that ambient light transmission is substantially blocked between the frame and the eye socket;
   a display screen fixed to an aperture in the frame;
   a visual cortex input detecting component attached to the flexible frame for positioning on the wearer's head proximate the visual cortex, the visual cortex input detecting component detects input from the visual cortex of the wearer;
   a first processor in communication with the visual cortex input detecting component that facilitates processing the input from the visual cortex, generating a display on the display screen based on the input from the visual cortex, and activating a plurality of tactile elements attached to the flexible frame and communicatively coupled with the first processor based on the input from the visual cortex,
   wherein the first processor is configured to selectively activate the tactile elements in response to the display on the display screen, receive feedback from the tactile elements by detecting actuation of different subsets of the tactile elements caused by different movements in muscles of the eye socket and manipulate the display on the display screen in accordance with the feedback; and
   a non-transitory processor readable storage medium for storing programming logic.

2. The system of claim 1, the programming logic comprising:
   a visual cortex display generating logic, executed by the first processor, for generating a display on the display screen based on the input from the visual cortex of the wearer.

3. The system of claim 2, the visual cortex display generating logic further comprises:
   avatar manipulation logic, executed by the first processor, for manipulating an avatar displayed on the display screen based on the input from the visual cortex of the wearer.

4. The apparatus of claim 3, the avatar manipulation logic further comprises:
   logic for moving the avatar vertically on the display screen based on the input from the visual cortex of the wearer.

5. The apparatus of claim 3, the avatar manipulation logic further comprises:
   logic for moving the avatar horizontally on the display screen based on the input from the visual cortex of the wearer.

6. The system of claim 2, the programming logic comprising:
   a visual cortex input storage logic, executed by the first processor, for storing the input from the visual cortex in a computer readable storage medium.

7. The system of claim 2, the visual cortex display generating logic further comprises:
   a secondary display generating logic, executed by the first processor, for generating the display based on stored input obtained from a visual cortex of a second user different from the wearer.

8. The system of claim 1, the programming logic further comprising:
   tactile element manipulation logic, executed by the first processor, for manipulating the tactile elements based on the input from the visual cortex of the wearer.

9. A method of providing content comprising:
   providing a visual cortex input detecting component attached to a flexible frame for positioning on a first user's head proximate the first user's visual cortex;
   obtaining, by a first processor as electrical signals, input from the first user's visual cortex via the visual cortex input detecting component;
   interpreting, by the first processor, the electrical signals to generate a representation of the input from the visual cortex of the first user;
   displaying, by the first processor to the first user, visual content based on the representation on a display screen fixed to a flexible frame of a wearable computing device, the flexible frame is engaged in a shape mating arrangement with at least one of the first user's eye;
   activating, by the first processor, a plurality of tactile elements attached to the flexible frame and communicatively coupled with the first processor based on the input from the visual cortex of the first user;

selectively activating, by the first processor, the plurality of tactile elements in response to the display on the display screen; and receiving, by the first processor, feedback from the tactile elements by detecting actuation of different subsets of the tactile elements caused by different movements in muscles of the eye socket and manipulating the display on the display screen in accordance with the feedback.

10. The method of claim 9, the visual content is the representation.

11. The method of claim 9, displaying the visual content to the first user based on the representation further comprises:

manipulating, by the first processor, using the input, a display shown to the first user prior to obtaining the input from the visual cortex.

12. The method of claim 11, the display comprises an avatar.

13. The method of claim 11, manipulating a display further comprises:

changing, by the first processor, a visual attribute of an element comprised in the display based on the input from the visual cortex.

14. The method of claim 9, the visual content comprises a pattern obtained as input from the visual cortex of the first user.

15. The method of claim 9, further comprising:

storing, by the first processor, the visual content based on the representation.

16. The method of claim 9, further comprising:

receiving, by the second processor, input from a visual cortex of the second user;

generating, by the second processor, new visual content by altering the visual content based on the input from the visual cortex of the second user; and storing, by the second processor, the new visual content in a processor readable storage medium.

17. A non-transitory computer readable storage medium, comprising processor-executable instructions for obtaining input from a visual cortex of a first user as electrical signals, the input obtained from a visual cortex input detecting component attached to a flexible frame and positioned on the first user's head proximate the first user's visual cortex;

generating a representation of the input from the visual cortex of the first user by interpreting the electrical signals;

displaying visual content based on the representation on a display screen fixed to a flexible frame of a wearable computing device, the flexible frame is engaged in a shape mating arrangement with at least one of the first user's eye;

activating a plurality of tactile elements attached to the flexible frame and communicatively coupled with the first processor based on the input from the visual cortex of the first user;

selectively activating the plurality of tactile elements in response to the display on the display screen; and receiving feedback from the tactile elements by detecting actuation of different subsets of the tactile elements caused by different movements in muscles of the eye socket and manipulating the display on the display screen in accordance with the feedback.

18. The computer readable medium of claim 17 wherein the visual content is the representation.

* * * * *